United States Patent
Zhu

(10) Patent No.: US 11,601,934 B2
(45) Date of Patent: Mar. 7, 2023

(54) DATA TRANSMISSION METHOD AND DEVICE

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 106 days.

(21) Appl. No.: 17/006,567

(22) Filed: Aug. 28, 2020

(65) Prior Publication Data
US 2020/0396735 A1  Dec. 17, 2020

Related U.S. Application Data

(63) Continuation of application No. PCT/CN2018/081398, filed on Mar. 30, 2018.

(51) Int. Cl.
| | |
|---|---|
| *H04J 3/00* | (2006.01) |
| *H04W 72/0446* | (2023.01) |
| *H04W 72/04* | (2023.01) |
| *H04W 72/08* | (2009.01) |

(52) U.S. Cl.
CPC ..... *H04W 72/0446* (2013.01); *H04W 72/042* (2013.01); *H04W 72/085* (2013.01)

(58) Field of Classification Search
CPC ........... H04W 72/0446; H04W 72/042; H04W 72/085
See application file for complete search history.

(56) References Cited

U.S. PATENT DOCUMENTS

| | | | |
|---|---|---|---|
| 2016/0227571 A1* | 8/2016 | Baek | H04L 5/0053 |
| 2018/0084432 A1* | 3/2018 | Kwak | H04W 74/0825 |
| 2018/0199308 A1* | 7/2018 | Liu | H04W 52/0274 |
| 2018/0241602 A1* | 8/2018 | Bhorkar | H04W 52/325 |
| 2019/0014483 A1 | 1/2019 | Kwak et al. | |
| 2019/0165846 A1* | 5/2019 | Kim | H04B 7/0643 |
| 2019/0215110 A1* | 7/2019 | Yang | H04W 74/0816 |
| 2019/0215888 A1* | 7/2019 | Cirik | H04W 72/0446 |
| 2019/0357224 A1* | 11/2019 | Li | H04L 5/0055 |

(Continued)

FOREIGN PATENT DOCUMENTS

| | | |
|---|---|---|
| CN | 105991210 A | 10/2016 |
| CN | 107852741 A | 3/2018 |

(Continued)

OTHER PUBLICATIONS

Extended European Search Report in the European Application No. 18911882.1, dated Oct. 22, 2021, (9p).

(Continued)

*Primary Examiner* — Abdelnabi O Musa
(74) *Attorney, Agent, or Firm* — Arch & Lake LLP

(57) ABSTRACT

Data transmission methods and devices are provided. A data sender determines a target sending position based on channel detection results of available sending positions within a set time window. The length of the set time window is associated with a type of data to be transmitted. The data to be transmitted includes signaling or a signal that is periodically sent. The length of the set time window does not exceed a transmission period of the data to be transmitted. The data sender may further transmit the data at the target sending position.

20 Claims, 6 Drawing Sheets

(56) References Cited

U.S. PATENT DOCUMENTS

2019/0364434 A1 11/2019 Kwak et al.
2021/0058795 A1 2/2021 Kwak et al.

FOREIGN PATENT DOCUMENTS

WO 2017167304 A1 10/2017
WO 2017190269 A1 11/2017

OTHER PUBLICATIONS

Office Action of the Indian Application No. 202047046693, dated Dec. 7, 2021, (6p).
ZTE:"Discussion on RRM measurement and DRS design for LAA",3GPP Draft; R1-151806 Discussion On RRM Measurement and DRS Design for LAA 3rd Generation Partnership PROJECT(3GPP), Mobile Competence Centre ; 650, Route Des Lucioles; F-06921 Sophia-Antipolis Ced, RAN WG1, Belgrade, Serbia; Apr. 20, 2015-Apr. 24, 2015 Apr. 19, 2015 (Apr. 19, 2015), XP050934667,Retrieved from the Internet: URL:http://www.3gpp.org/ftp/Meetings_3GPP_SYNC/RAN1 /Docs/[retrieved on Apr. 19, 2015], (5p).
English translation of the Written Opinion of the International Search Authority in the International Application No. PCT/CN2018/081398, dated Jan. 4, 2019, (4p).
First Office Action of the Chinese Application No. 201880000370.1, dated Jan. 20, 2021, (16p).
International Search Report in the International Application No. PCT/CN2018/081398 dated Jan. 4, 2019 with English translation, (4p).
Samsung, "Discussion on LAA DRS design" 3GPP TSG RAN WG1 Meeting #80bis, R1-151619, Belgrade, Serbia, Apr. 24, 2015, (5p).

* cited by examiner

DATA TRANSMISSION METHOD AND DEVICE

CROSS-REFERENCE TO RELATED APPLICATION

This application is a continuation of International Patent Application No. PCT/CN2018/081398 filed on Mar. 30, 2018, the entire contents of which are incorporated herein by reference in their entirety for all purposes.

TECHNICAL FIELD

The present disclosure relates to the technical field of communication, and more particularly, to a data transmission method and device.

BACKGROUND

Along with the rapid development of wireless communication technologies, most of spectrum resources in licensed spectra have been occupied by various communication systems. Therefore, for extending frequency resources and increasing the beam selection rate and the throughput, working bands of wireless communication systems are extended to unlicensed spectra. For an unlicensed spectrum, a License Assisted Access (LAA) mechanism has been proposed for the use of an unlicensed band, that is, use of an unlicensed band is implemented by LAA.

In related art, for ensuring coexistence with another communication system working in an unlicensed band, for example, Wireless-Fidelity (WIFI), a contention-based channel access mechanism adopting Listen-Before-Talk (LBT) is introduced to LAA. A sender, when having data to be sent, needs to detect whether a channel is idle or not. Only when the channel is in the idle state, the sender can send the data. However, for some signals needed to be periodically sent, for example, a Discovery Reference Signal (DRS) for Radio Resource Management (RRM), since the signals are sent at fixed positions according to certain periods, the signals may be continuously tried to be sent in next periods when LBT detection fails. In the related art, User Equipment (UE) can only send data at a preconfigured position that cannot be dynamically changed, which may increase latency. Such related art is inapplicable to a service with a high requirement on latency.

SUMMARY

In view of this, the present disclosure provides a data transmission method and device.

According to a first aspect of the present disclosure, a data transmission method is provided. The method is applied to a data sender, and may include the data sender determining a target sending position based on channel detection results of available sending positions within a set time window. The length of the set time window may be associated with a type of data to be transmitted. The data to be transmitted may include signaling or a signal that is periodically sent. The length of the set time window may not exceed a transmission period of the data to be transmitted. The data sender may further transmit the data at the target sending position.

According to a second aspect of the present disclosure, a data transmission method is provided. The method is applied to a data receiver, and may include the data receiver determining a receiving position configured to listen data to be transmitted within a set time window. The length of the set time window may be associated with a type of the data to be transmitted. The data to be transmitted may include signaling or a signal that is periodically sent. The data receiver may further listen for the data to be transmitted at the receiving position.

According to a third aspect of the present disclosure, a device for data transmission is provided. The device may include one or more processors, a non-transitory computer-readable memory storing instructions executable by the one or more processors. The one or more processors may be configured to determine a target sending position based on channel detection results of available sending positions within a set time window. The length of the set time window may be associated with a type of data to be transmitted. The data to be transmitted may include signaling or a signal that is periodically sent. The length of the set time window may not exceed a transmission period of the data to be transmitted. The device may further transmit the data at the target sending position.

According to a fourth aspect of the present disclosure, a device for data transmission is provided. The device may include one or more processors, a non-transitory computer-readable memory storing instructions executable by the one or more processors. The one or more processors may be configured to determine a receiving position configured to listen data to be transmitted within a set time window. The length of the set time window may be associated with a type of the data to be transmitted. The data to be transmitted may include signaling or a signal that is periodically sent. The device may further listen for the data to be transmitted at the receiving position.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

A detailed description will now be made to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure, as recited in the appended claims.

The terms used in the present disclosure are for the purpose of describing particular examples only and are not intended to limit the present disclosure. Terms determined by "a," "the" and "said" in their singular forms in the present disclosure and the appended claims are also intended to include a plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred to as second information; and similarly, second information may also be referred as first information. Depending on the context, the word "if" as used herein may be interpreted as "when" or "upon" or "in response to determining."

Figure 1A:
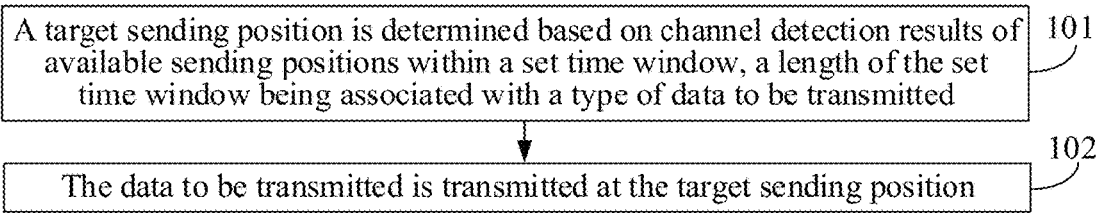
FIG. 1A is a flowchart showing a data transmission method, according to an example of the present disclosure.
Figure 1B:
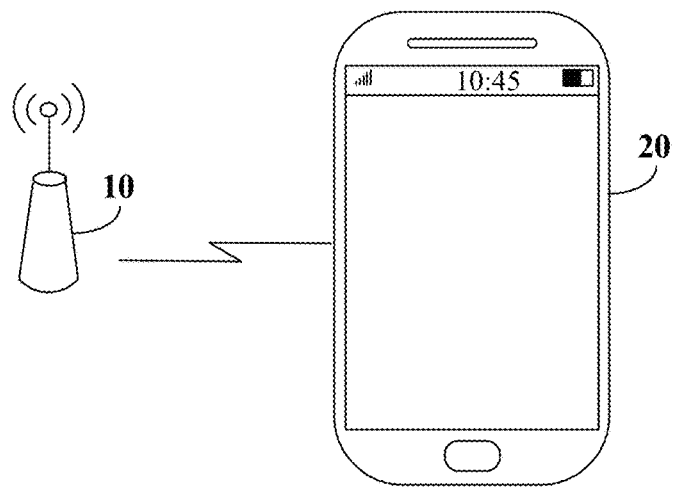
FIG. 1B is a scenario diagram of a data transmission method, according to an example of the present disclosure.
Figure 1C:
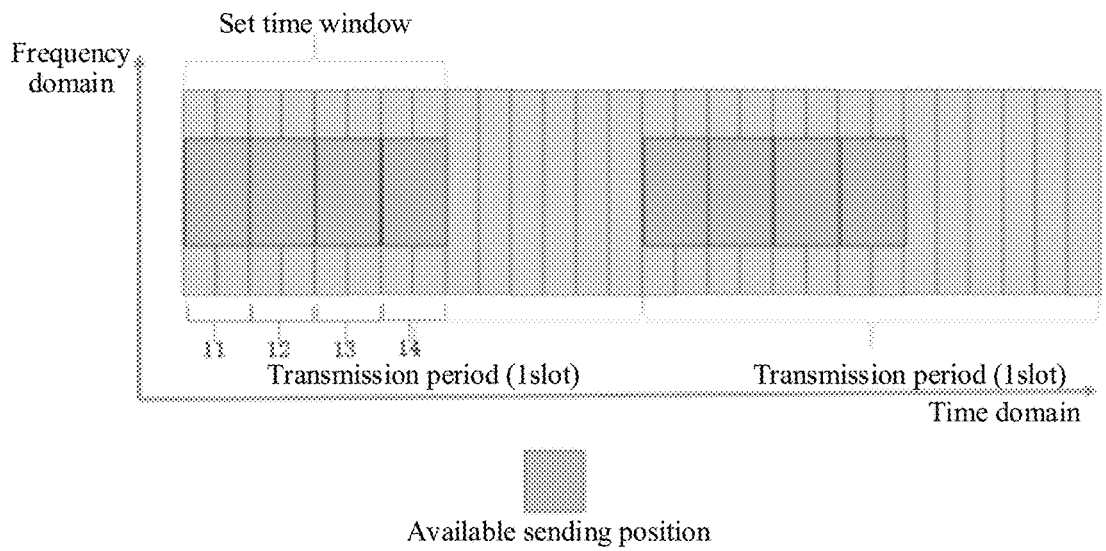
FIG. 1C is a first schematic diagram illustrating available sending positions within a set time window, according to an example of the present disclosure.
Figure 1D:
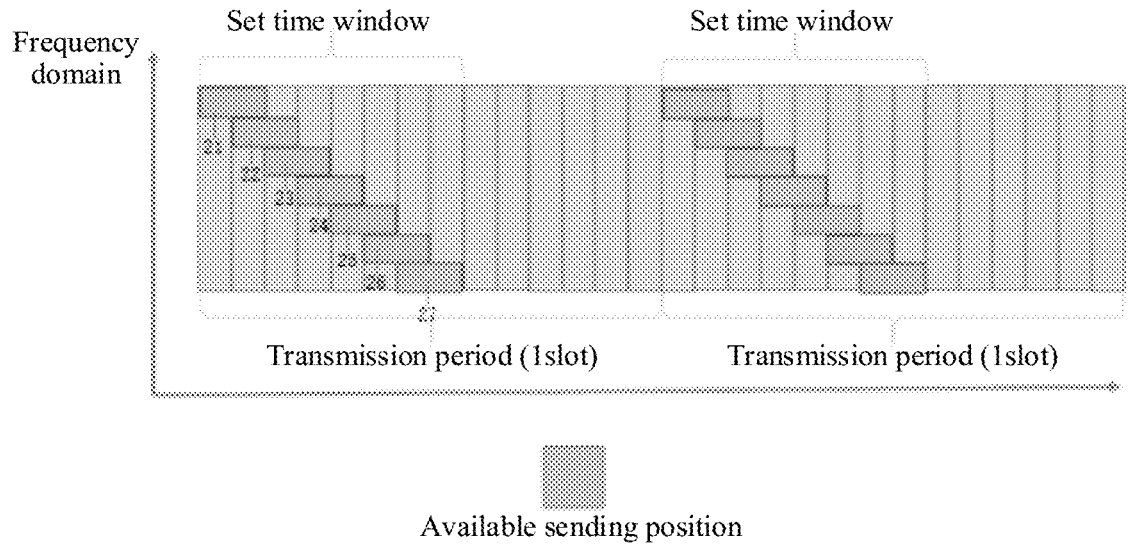
FIG. 1D is a second schematic diagram illustrating available sending positions within a set time window, according to an example of the present disclosure.

FIG. 1A is a flowchart showing a data transmission method according to an embodiment. FIG. 1B is a scenario diagram of a data transmission method according to an embodiment. FIG. 1C is a first schematic diagram illustrating available sending positions within a set time window according to an embodiment. FIG. 1D is a second schematic diagram illustrating available sending positions within a set time window according to an embodiment. The data transmission method may be applied to data senders, for example, User Equipment (UE) and a base station. As shown in FIG. 1A, the data transmission method includes the following operations 101-102.

In operation 101, a target sending position is determined based on channel detection results of available sending positions within a set time window, a length of the set time window is associated with a type of data to be transmitted. The target sending position, for example, may be an available sending position of which a channel detection results in an unoccupied state from the available sending positions within the set time window. An available sending position, for example, may include a period of time where a message may be sent. A type of data to be transmitted, for example, may include a signal with relatively high latency requirement.

In some embodiments, the data to be transmitted may be signaling or signal that is periodically sent, for example, a Discovery Reference Signal (DRS). The data to be transmitted may have different functions, for example, a signal for cell search and a signal for cell measurement. For different types of data to be transmitted, time windows with different time lengths/durations may be set, and a transmission opportunity of the signal in a period can be further regulated. For example, for an important signal or signaling with a relatively high latency requirement, a relatively long-time window may be configured, and furthermore, a transmission opportunity of the important signal or the signaling with the relatively high latency requirement can be increased.

In one or more embodiments, the length or duration of the set time window does not exceed a transmission period of the data to be transmitted. For example, if a transmission period of a signal is configured by a base station to be one slot and a transmission length of the signal is two symbols, then a set time window with a length of eight symbols may be preconfigured. Here, one symbol may refer to a period of transmitting one symbol.

In an embodiment, the set time window may be set by the base station based on the type of data to be transmitted. In an embodiment, the set time window may be predetermined by a system through a protocol.

In some embodiments, the available sending position within the set time window can be understood as a preconfigured position available for sending a signal within the set time window, and may be determined based on a preconfigured possible initial transmission position. For example, referring to FIG. 1C, the transmission period of a signal is one slot, the length of the set time window is eight symbols, and the transmission length of the signal is two symbols. In such a case, preconfigured possible initial transmission positions are the first, third, fifth, and seventh symbols, and then it can be determined that the available sending positions within the set time window are positions marked with signs 11, 12, 13, and 14.

In some embodiments, the available sending positions within the set time window may also be implicitly determined based on a set rule. For example, referring to FIG. 1D, the transmission period of a signal is one slot, the length of a set time window is eight symbols, and the transmission length of the signal is two symbols. In such case, the preconfigured set rule is that any symbol within the set time window can be an available sending position, and then it can be determined that the available sending positions within the set time window are every symbol, i.e., the positions marked with signs 21, 22, 23, 24, 25, 26 and 27. In FIG. 1D, the available sending positions marked with the signs 21, 22, 23, 24, 25, 26 and 27 correspond to different frequency-domain resources, but this is only schematic. Frequency-domain resources corresponding to data sending at the available sending positions may be the same or may also be different.

In one or more embodiments, in response to detecting that channel detection at the first available sending position within the set time window succeeds, for example, channel detection at the available sending position marked with the sign 11 in FIG. 1C succeeds, the available sending position marked with the sign 11 can be directly determined as the target sending position, and channel detection is no more performed on the other subsequent available sending positions. In an embodiment, if channel detection at the first available sending position within the set time window fails, the data may be tried to be sent at the next available sending position until the data is successfully sent.

In operation 102, the data to be transmitted is transmitted at the target sending position.

In some embodiments, the data sender may send the data at the target sending position through a frequency-domain resource corresponding to the sending position.

In an example scenario, as shown in FIG. 1B, example descriptions are made with the condition that a mobile network is anew-generation network, for example, a 5th-Generation (5G) network, and a base station is a gNB as an example. The scenario is shown in FIG. 1B includes the gNB 10 and UE 20. When predefined data to be transmitted is periodically sent between the gNB 10 and the UE 20 through an unlicensed band, the data may be tried to be sent at multiple available sending positions within a set time window, so that the problem that predefined data to be transmitted cannot be sent due to a channel detection failure is solved.

In some embodiments, through operations 101-102, a set time window matched with the type of data to be transmitted can be configured for the data to be transmitted that is periodically sent. Multiple sending positions may be set in each set time window, and the length of a set time window is matched with the type of data to be transmitted. Therefore, through the technical improvements of the present disclosure, the signaling or signal transmission latency caused by channel uncertainties can be reduced, and transmission of a service with a relatively high latency requirement is ensured.

The technical improvements provided in some embodiments of the present disclosure will be described below with specific embodiments.

Figure 2:
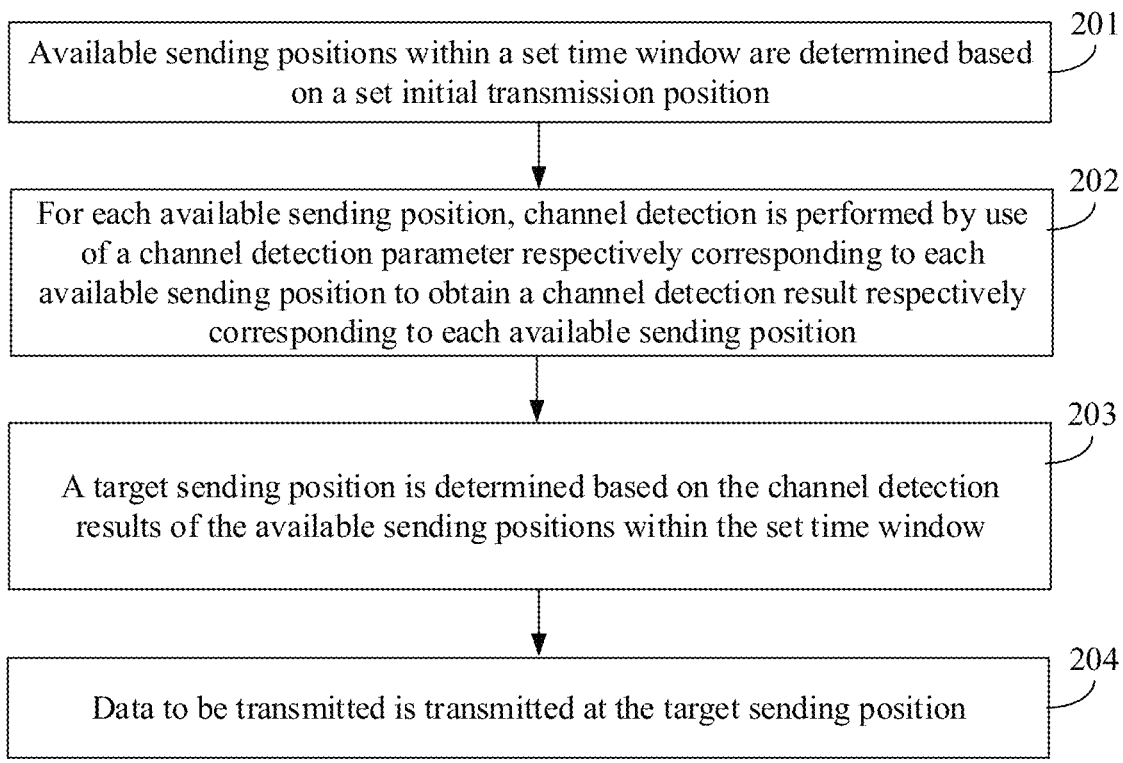
FIG. 2 is a flowchart showing another data transmission method, according to an example of the present disclosure.

FIG. 2 is a flowchart showing another data transmission method according to an example embodiment. In one or more embodiments, example descriptions are made based on the method provided in the embodiments of the present disclosure with the condition that a data sender determines available sending positions based on a set initial transmission position as an example. As shown in FIG. 2, the following operations are included.

In operation 201, available sending positions within a set time window are determined based on a set initial transmission position.

In an embodiment, a length of the set time window is associated with a type of data to be transmitted. The data to be transmitted may be signaling or signal that is periodically sent, and the length of the set time window does not exceed a transmission period of the data to be transmitted.

In some embodiments, the set time window may be set by a base station and sent to UE through Radio Resource Control (RRC) signaling, a Media Access Control (MAC) Control Element (CE) or physical-layer signaling. In an embodiment, the set time window may be predetermined by a system through a protocol.

In one or more embodiments, the available sending position within the set time window can be understood as a preconfigured position available for sending a signal within the set time window, and may be determined based on the set possible initial transmission position. For example, referring to FIG. 1C, the transmission period of a signal is one slot, the length of a set time window is eight symbols, and the transmission length of the signal is two symbols. In such case, preconfigured possible initial transmission positions are the first, third, fifth and seventh symbols, and then it can be determined that the available sending positions within the set time window are positions marked with signs 11, 12, 13, and 14.

In one or more embodiments, the set initial position may be set by the base station and sent to the UE through the RRC signaling, the MAC CE or the physical-layer signaling.

In an embodiment, the set initial position may be predetermined by a system through a protocol.

In operation 202, for each available sending position, channel detection is performed by use of a channel detection parameter respectively corresponding to each available sending position to obtain a channel detection result respectively corresponding to each available sending position.

In some embodiments, when the data is transmitted at each available sending position within the set time window, different frequency-domain resources may be adopted, and the channel detection parameters for channel detection over the available sending positions may be different.

In operation 203, a target sending position is determined based on the channel detection results of the available sending positions within the set time window.

In some embodiments, when a channel detection result of a first available sending position within the set time window is that channel detection succeeds, the first available sending position may be directly determined as the target sending position. When the channel detection result of the first available sending position within the set time window is that channel detection fails, channel detection may be sequentially performed on the next available sending position until the target sending position where the data can be sent is detected.

In operation 204, data to be transmitted is transmitted at the target sending position.

In one or more embodiments, the data sender may send the data to be transmitted at the target sending position through a frequency-domain resource corresponding to the sending position.

In one or more embodiments, an implementation manner of determining the available sending positions within the set time window is described. The data sender may determine all the available sending positions based on the preconfigured set initial transmission position and further determine the target sending position from the available sending positions, so that the signaling or signal transmission latency caused by channel uncertainties can be effectively reduced.

Figure 3:
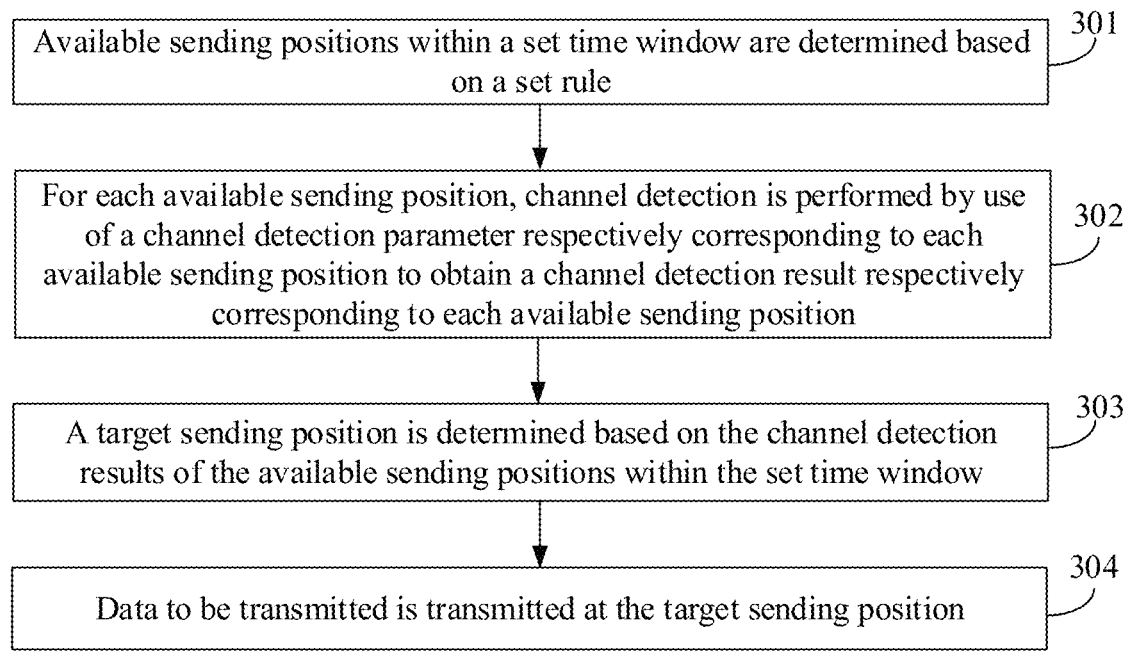
FIG. 3 is a flowchart showing another data transmission method, according to an example of the present disclosure.

FIG. 3 is a flowchart showing another data transmission method according to an example embodiment. In some embodiments, example descriptions are made based on the method provided in the embodiments of the present disclosure with the condition that a data sender determines available sending positions based on a set rule as an example. As shown in FIG. 3, the following operations are included.

In operation 301, available sending positions within a set time window are determined based on a set rule.

In some embodiments, the set rule may be set by a base station and sent to UE through RRC signaling, a MAC CE or physical-layer signaling. In an embodiment, the set rule may be predetermined by a system through a protocol.

In one or more embodiments, the set rule may be a rule of determining the available sending positions. That is, the set rule may be configured to determine specific resource positions for data transmission. For example, the set rule may be that any symbol within the set time window may be an available sending position, referring to FIG. 1D. The set rule may also be some other rules apparent to those skilled in the art and configured to indicate the resource positions.

In operation 302, for each available sending position, channel detection is performed by use of a channel detection parameter respectively corresponding to each available sending position to obtain a channel detection result respectively corresponding to each available sending position.

In operation 303, a target sending position is determined based on the channel detection results of the available sending positions within the set time window.

In operation 304, data to be transmitted is transmitted at the target sending position.

In some embodiments, descriptions about operation 302 to operation 304 may refer to the descriptions about operation 202 to operation 204 in the embodiment shown in FIG. 2, and elaborations are omitted herein.

In some embodiments, an implementation manner of determining the available sending positions within the set time window is described. The data sender may determine all the available sending positions based on the set rule and further determine the target sending position in the available sending positions, so that the signaling or signal transmission latency caused by channel uncertainties may be effectively reduced.

Figure 4:
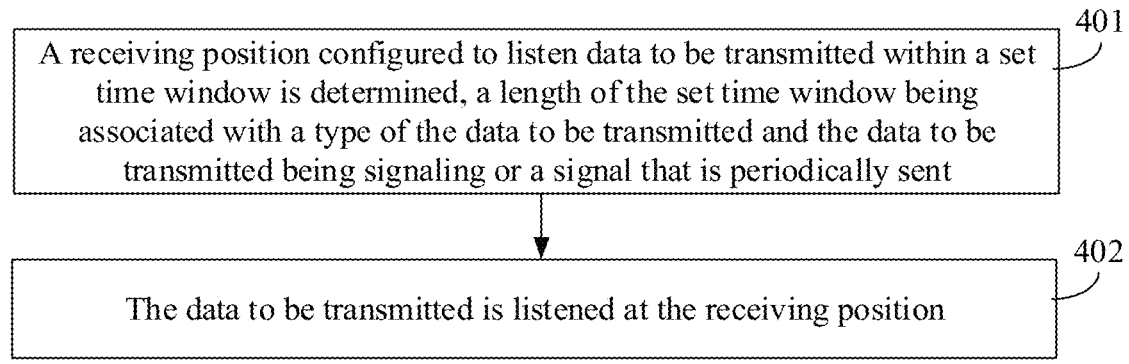
FIG. 4 is a flowchart showing a data transmission method, according to an example of the present disclosure.

FIG. 4 is a flowchart showing a data transmission method according to an example embodiment. The data transmission method may be applied to data receivers, for example, UE and a base station. As shown in FIG. 4, the data transmission method includes the following operations 401-402.

In operation 401, a receiving position configured to listen data to be transmitted within a set time window is determined, a length of the set time window being associated with a type of the data to be transmitted and the data to be transmitted being signaling or a signal that is periodically sent.

In one or more embodiments, the set time window may be set by a base station based on the type of data to be transmitted and may be sent to UE through RRC signaling, a MAC CE or physical-layer signaling. Or, the set time window may be predetermined in a protocol.

In one or more embodiments, the receiving position within the set time window may be determined based on a set initial transmission position. For example, referring to FIG. 1C, a transmission period of a signal is one slot, the length of the set time window is eight symbols, and a transmission length of the signal is two symbols. In such a case, preconfigured possible initial transmission positions are the first, third, fifth, and seventh symbols, and then it may be determined that the receiving position within the set time window is positions marked with signs 11, 12, 13, and 14.

In one or more embodiments, the receiving position within the set time window may be determined based on a set rule. For example, referring to FIG. 1D, the preconfigured set rule may be that any symbol within the set time window may be an available sending position, and then it can be determined that available sending positions within the set time window are all the symbols, namely the receiving position configured to listen the data to be transmitted within the set time window is the whole set time window.

In some embodiments, the set initial transmission position or the set rule may be configured by the base station and sent to the UE through the RRC signaling, the MAC CE or the physical-layer signaling. In an embodiment, the set initial transmission position or the set rule may also be predetermined by a system through a protocol.

In operation 402, the data to be transmitted is listened at the receiving position.

In some embodiments, if data to be transmitted is received at a receiving position, the terminal may not continue listening for the data to be transmitted at subsequent receiving positions.

The embodiment describes that a data receiver determines a receiving position based on a set time window and a set initial transmission position or a set rule configured by a base station or by a system through a protocol and listens the data to be transmitted. The data receiver may listen the data to be transmitted at the receiving position within the set time window, so that the signal transmission latency caused by channel uncertainties during data transmission in an unlicensed spectrum can be effectively reduced.

Figure 5:
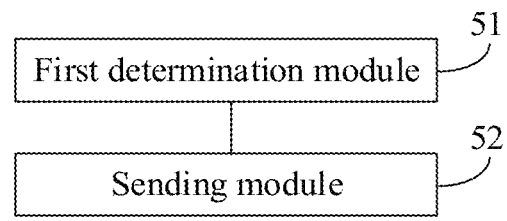
FIG. 5 is a block diagram of a data transmission device, according to an example of the present disclosure.

FIG. 5 is a block diagram of a data transmission device according to an example embodiment. The data transmission device is applied to a data sender. As shown in FIG. 5, the data transmission device includes: a first determination module 51, configured to determine a target sending position based on channel detection results of available sending positions within a set time window, a length of the set time window being associated with a type of data to be transmitted, the data to be transmitted being signaling or a signal that is periodically sent and the length of the set time window not exceeding a transmission period of the data to be transmitted; and a sending module 52, configured to transmit the data at the target sending position.

Figure 6:
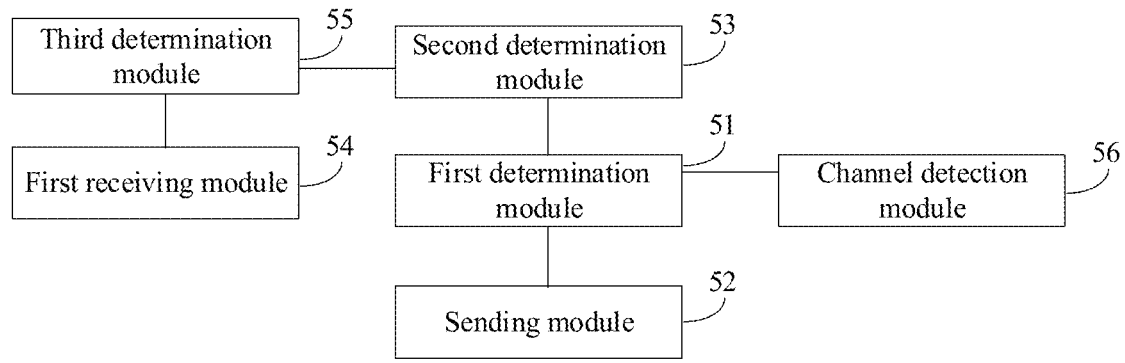
FIG. 6 is a block diagram of another data transmission device, according to an example of the present disclosure.

FIG. 6 is a block diagram of a device applicable to data transmission according to an example embodiment. As shown in FIG. 6, based on the embodiment shown in FIG. 5, the set time window is set by a base station based on the type of the data to be transmitted; or, the set time window is predetermined in a protocol in an embodiment.

In some embodiments, the device may further include: a second determination module 53, configured to determine the available sending positions within the set time window based on a set initial transmission position, or, determine the available sending positions within the set time window based on a set rule.

In one or more embodiments, the set initial transmission position or the set rule may be set by the base station; or, the set initial transmission position or the set rule may be predetermined in the protocol.

In one or more embodiments, when the data sender is UE, the device may further include: a first receiving module 54, configured to receive RRC signaling, or MAC CE or physical-layer signaling from the base station; and a third determination module 55, configured to determine the set time window and determine the set initial transmission position or the set rule based on the RRC signaling, or the MAC CE or the physical-layer signaling.

In some embodiments, the first determination module 51 is configured to determine a first available sending position of which a channel detection results in an unoccupied state from the available sending positions within the set time window as the target sending position.

In some embodiments, the device may further include: a channel detection module 56, configured to, for each available sending position, perform channel detection by use of a channel detection parameter respectively corresponding to each available sending position to obtain a channel detection result respectively corresponding to each available sending position.

Figure 7:
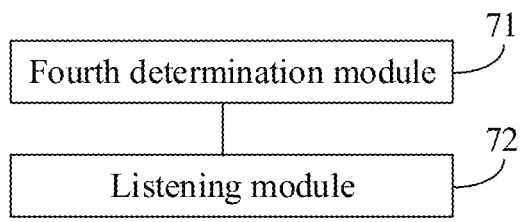
FIG. 7 is a block diagram of a data transmission device, according to an example of the present disclosure.

FIG. 7 is a block diagram of a data transmission device according to an example embodiment. The data transmission device is applied to a data receiver. As shown in FIG. 7, the data transmission device includes: a fourth determination module 71, configured to determine a receiving position configured to listen data to be transmitted within a set time window, a length of the set time window being associated with a type of the data to be transmitted and the data to be transmitted being signaling or a signal that is periodically sent; and a listening module 72, configured to listen the data to be transmitted at the receiving position.

Figure 8:
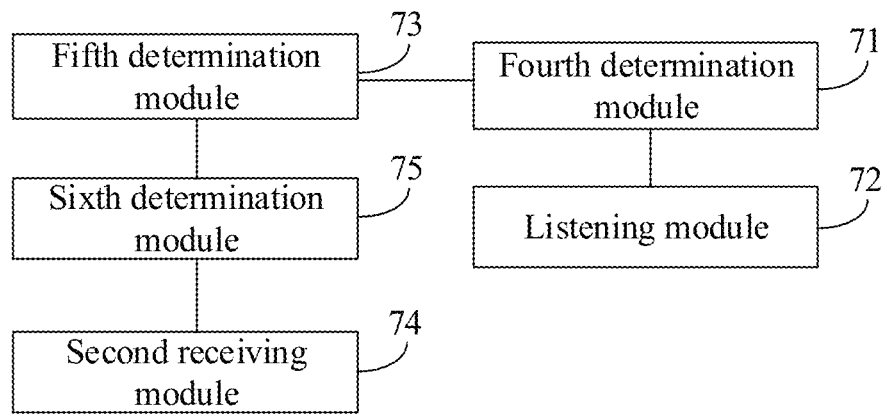
FIG. 8 is a block diagram of another data transmission device, according to an example of the present disclosure.

FIG. 8 is a block diagram of a device applicable to data transmission according to an example embodiment. As shown in FIG. 8, based on the embodiment shown in FIG. 7, the set time window is set by a base station based on the type of the data to be transmitted; or, the set time window is predetermined in a protocol in an embodiment.

In some embodiments, the device may further include: a fifth determination module 73, configured to determine the receiving position within the set time window based on a set initial transmission position, or, determine the receiving position within the set time window based on a set rule.

In some embodiments, when the data receiver is UE, the device may further include: a second receiving module 74, configured to receive RRC signaling or MAC CE or physical-layer signaling from the base station; and a sixth determination module 75, configured to determine the set time window and determine the set initial transmission position or the set rule based on the RRC signaling, or the MAC CE or the physical-layer signaling.

With respect to the devices in the above embodiments, the specific manners for performing operations for individual modules therein have been described in detail in the embodiment regarding the method, which will not be elaborated herein.

Figure 9:
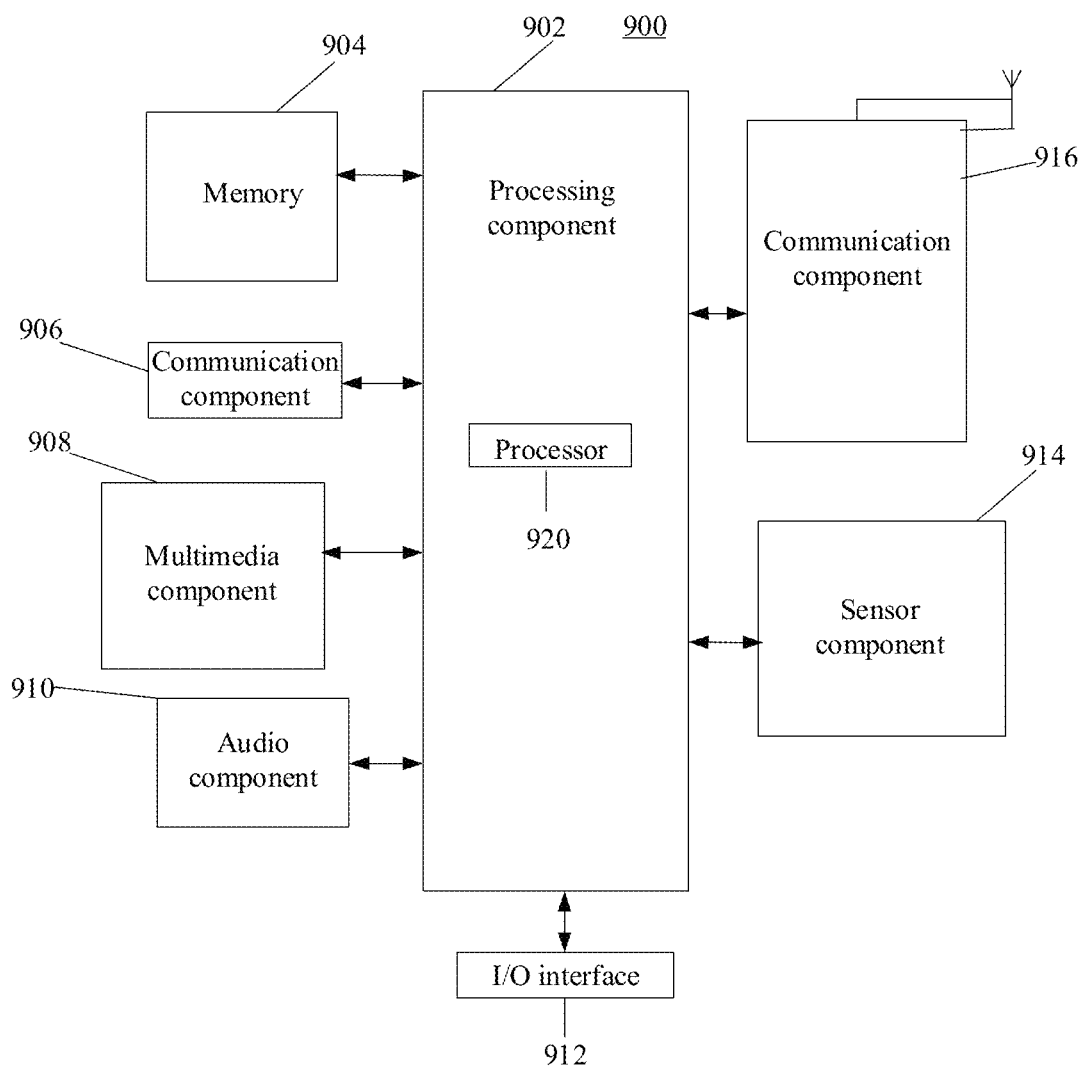
FIG. 9 is a block diagram of a device applicable to data transmission, according to an example of the present disclosure.
Figure 10:
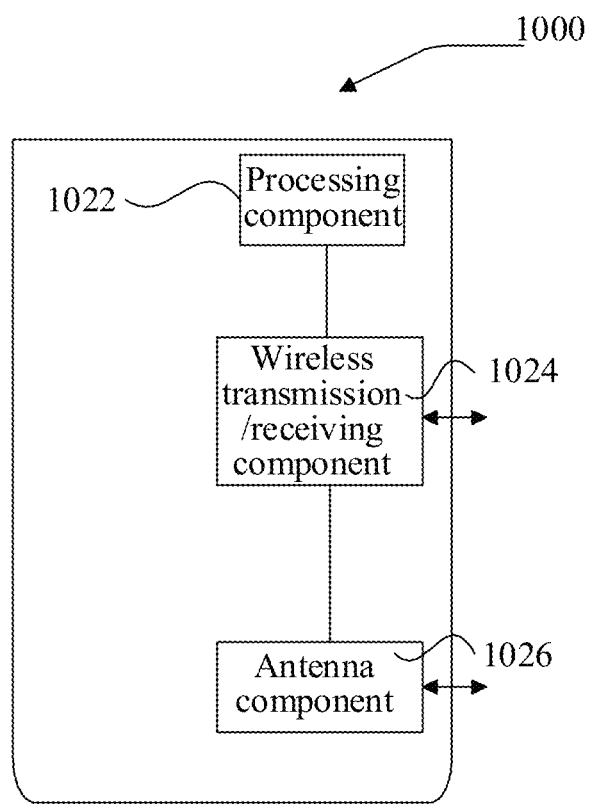
FIG. 10 is a block diagram of a device applicable to data transmission, according to an example of the present disclosure.

The technical improvements provided in some embodiments of the present disclosure may be applied to UE in FIG. 9 and may also be applied to a base station in FIG. 10.

FIG. 9 is a block diagram of a device applicable to data transmission according to an example embodiment. For example, the device 900 may be UE, such as a mobile phone, a computer, a digital broadcast terminal, a messaging device, a gaming console, a tablet, a medical device, exercise equipment, and a personal digital assistant.

Referring to FIG. 9, the device 900 may include one or more of the following components: a processing component 902, a memory 904, a power component 906, a multimedia component 908, an audio component 912, an Input/Output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the operations in the abovementioned methods. Moreover, the processing component 902 may include one or more modules which facilitate interaction between the processing component 902 and the other components. For instance, the processing component 902 may include a multimedia module to facilitate interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 provides power for various components of the device 900. The power component 906 may include a power management system, one or more power supplies, and other components associated with generation, management and distribution of power for the device 900.

The multimedia component 908 includes a screen providing an output interface between the device 900 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may sense not only a boundary of a touch or swipe action but also detect a duration and pressure associated with the touch or swipe action. In some embodiments, the multimedia component 908 includes a front camera and/or a rear camera. The front camera and/or the rear camera may receive external multimedia data when the device 900 is in an operation mode, such as a photographing mode or a video mode. Each of the front camera and the rear camera may be a fixed optical lens system or have focusing and optical zooming capabilities.

The audio component 912 is configured to output and/or input an audio signal. For example, the audio component 912 includes a Microphone (MIC), and the MIC is configured to receive an external audio signal when the device 900 is in the operation mode, such as a call mode, a recording mode, and a voice recognition mode. The received audio signal may further be stored in the memory 904 or sent through the communication component 916. In some embodiments, the audio component 912 may further include a speaker configured to output the audio signal.

The I/O interface 912 provides an interface between the processing component 902 and a peripheral interface module, and the peripheral interface module may be a keyboard, a click wheel, a button, and the like. The button may include, but not limited to: a home button, a volume button, a starting button, and a locking button.

The sensor component 914 includes one or more sensors configured to provide status assessment in various aspects for the device 900. For instance, the sensor component 914 may detect an on/off status of the device 900 and relative positioning of components, such as a display and small keyboard of the device 900, and the sensor component 914 may further detect a change in a position of the device 900 or a component of the device 900, presence or absence of contact between the user and the device 900, orientation or acceleration/deceleration of the device 900 and a change in temperature of the device 900. The sensor component 914 may include a proximity sensor configured to detect the presence of an object nearby without any physical contact. The sensor component 914 may also include a light sensor, such as a Complementary Metal Oxide Semiconductor (CMOS) or Charge Coupled Device (CCD) image sensor, configured for use in an imaging application. In some embodiments, the sensor component 914 may also include an acceleration sensor, a gyroscope sensor, a magnetic sensor, a pressure sensor or a temperature sensor.

The communication component 916 is configured to facilitate wired or wireless communication between the device 900 and another device. The device 900 may access a communication-standard-based wireless network, such as a WIFI network, a 2nd-Generation (2G) or 3rd-Generation (3G) network or a combination thereof. In an example embodiment, the communication component 916 receives a broadcast signal or broadcast associated information from an external broadcast management system through a broadcast channel. In an example embodiment, the communication component 916 may further include a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology, and another technology.

In an example embodiment, the device 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method described according to the first aspect or the second aspect.

In an example embodiment, there is also provided a non-transitory computer-readable storage medium including instructions, such as the memory 904 including instructions, and the instructions may be executed to cause the processor 920 of the device 900 to implement the method described according to the first aspect or the second aspect.

FIG. 10 is a block diagram of a device applicable to data transmission according to an example embodiment. The device 1000 may be provided as a base station. Referring to FIG. 10, the device 1000 includes a processing component 1022, a wireless transmission/receiving component 1024, an antenna component 1026, and a wireless interface-specific signal processing part, and the processing component 1022 may further include one or more processors.

One processor in the processing component 1022 may be configured to implement the method described according to the first aspect or the second aspect.

In an example embodiment, a non-transitory computer-readable storage medium including instructions is also provided in a base station, in which computer instructions are stored, the instructions being executed by a processor to implement the method described according to the first aspect or the second aspect.

The technical improvements provided in some embodiments of the present disclosure may have the following beneficial effects.

A set time window matched with the type of data to be transmitted can be configured for the data to be transmitted that is periodically sent. Multiple sending positions may be set in each set time window, and the length of the set time window is matched with the type of the data to be transmitted. Therefore, through the technical improvements of the present disclosure, the signaling or signal transmission latency caused by channel uncertainties can be reduced, and transmission of a service with a relatively high latency requirement is ensured.

The terms used in the embodiments of the present disclosure are for the purpose of describing the specific embodiments only, and are not intended to limit the embodiments of the present disclosure. Unless otherwise defined, technical terms or scientific terms used in the embodiments of the present disclosure should be understood in the ordinary meaning of those of ordinary skill in the art to which the present disclosure pertains. The words "first," "second" and similar terms used in the specification and claims of the present disclosure are not intended to indicate any order, quantity or importance, but only to distinguish different components. Similarly, the words "a" or "an" and the like do not denote a quantity limitation, but mean that there is at least one. "Multiple" or "several" means two or more than two. The similar words "including" or "comprising" and the like mean that elements or objects preceding "including" or "comprising" encompass elements or objects listed after "including" or "comprising" and their equivalents, and do not exclude other elements or objects. The similar words "connecting" or "connected" and the like are not limited to physical or mechanical connections, and may include electrical connections, whether direct or indirect. The singular forms "a," "the," and "this" used in the specification of the embodiments of the present disclosure and the appended claims are also intended to include a plurality of forms unless the context clearly indicates otherwise. It should also be understood that the term "and/or" as used herein refers to and encompasses any or all possible combinations of one or more of the associated listed items.

Other implementations of the present disclosure will be apparent to those skilled in the art from consideration of the specification and practice of the present disclosure. This present application is intended to cover any variations, uses, or adaptations of the present disclosure following the general principles thereof and including such departures from the present disclosure as come within known or customary practice in the art. It is intended that the specification and examples be considered as examples only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for data transmission, applied to a data sender, the method comprising:
   determining a target sending position based on channel detection results of available sending positions within a set time window, wherein a length of the set time window is associated with a type of data to be transmitted, wherein the data to be transmitted comprises signaling or a signal that is periodically sent, and wherein the length of the set time window does not exceed a transmission period of the data to be transmitted, and wherein a length of a set time window for a first signal or signaling is longer than a length of a set time window for other signals or signaling, and the first signal or signaling has higher latency requirement than the other signals or signaling; and
   transmitting the data at the target sending position.

2. The method of claim 1, wherein the set time window is either set by a base station based on the type of the data to be transmitted or predetermined in a protocol.

3. The method of claim 1, further comprising:
   determining the available sending positions within the set time window based on either a set initial transmission position or a set rule.

4. The method of claim 3, wherein the set initial transmission position or the set rule is either set by a base station or predetermined in a protocol.

5. The method of claim 3, wherein when the data sender is User Equipment (UE), the method further comprises:
   receiving Radio Resource Control (RRC) signaling or Media Access Control (MAC) Control Element (CE) or physical-layer signaling from a base station; and determining the set time window and determining the set initial transmission position or the set rule based on the RRC signaling, or the MAC CE or the physical-layer signaling.

6. The method of claim 1, wherein determining the target sending position based on the channel detection results of the available sending positions within the set time window comprises:
determining a first available sending position of which a channel detection result is an unoccupied state from the available sending positions within the set time window as the target sending position.

7. The method of claim 1, further comprising:
performing channel detection to at least one available sending position by applying a channel detection parameter respectively corresponding to the at least one available sending position to obtain a channel detection result respectively corresponding to the at least one available sending position.

8. A method for data transmission, applied to a data receiver, the method comprising:
determining a receiving position configured to listen data to be transmitted within a set time window, wherein a length of the set time window is associated with a type of the data to be transmitted, and wherein the data to be transmitted comprises signaling or a signal that is periodically sent, and wherein a length of a set time window for a first signal or signaling is longer than a length of a set time window for other signals or signaling, and the first signal or signaling has higher latency requirement than the other signals or signaling; and
listening for the data to be transmitted at the receiving position.

9. The method of claim 8, wherein the set time window is either set by a base station based on the type of the data to be transmitted or, predetermined in a protocol.

10. The method of claim 8, further comprising:
determining the receiving position within the set time window based on either a set initial transmission position or a set rule.

11. The method of claim 10, wherein when the data receiver is User Equipment (UE), the method further comprises:
receiving Radio Resource Control (RRC) signaling or Media Access Control (MAC) Control Element (CE) or physical-layer signaling from a base station; and
determining the set time window and determining the set initial transmission position or the set rule based on the RRC signaling, or the MAC CE or the physical-layer signaling.

12. A device for data transmission, comprising:
one or more processors; and
a non-transitory computer-readable storage medium for storing instructions executable by the one or more processors,
wherein the one or more processors are configured to:
determine a target sending position based on channel detection results of available sending positions within a set time window, wherein a length of the set time window is associated with a type of data to be transmitted, wherein the data to be transmitted comprises signaling or a signal that is periodically sent, and wherein the length of the set time window does not exceed a transmission period of the data to be transmitted, and wherein a length of a set time window for a first signal or signaling is longer than a length of a set time window for other signals or signaling, and the first signal or signaling has higher latency requirement than the other signals or signaling; and
transmit the data at the target sending position.

13. The device of claim 12, wherein the set time window is either set by a base station based on the type of the data to be transmitted or predetermined in a protocol.

14. The device of claim 12, wherein the one or more processors are further configured to:
determine the available sending positions within the set time window based on either a set initial transmission position or a set rule.

15. The device of claim 14, wherein the one or more processors are further configured, when the device is on a User Equipment (UE) side, to:
receive Radio Resource Control (RRC) signaling or Media Access Control (MAC) Control Element (CE) or physical-layer signaling from a base station; and
determine the set time window and determine the set initial transmission position or the set rule based on the RRC signaling, or the MAC CE or the physical-layer signaling.

16. The device of claim 12, wherein the one or more processors are further configured to:
determine a first available sending position of which a channel detection result is an unoccupied state from the available sending positions within the set time window as the target sending position.

17. The device of claim 12, wherein the one or more processors are further configured to:
perform channel detection to at least one available sending position by applying a channel detection parameter respectively corresponding to the at least one available sending position to obtain a channel detection result respectively corresponding to the at least one available sending position.

18. A device for data transmission, comprising:
one or more processors; and
a non-transitory computer-readable storage medium storing instructions executable by the one or more processors,
wherein the one or more processors are configured to:
determine a receiving position configured to listen data to be transmitted within a set time window, wherein a length of the set time window is associated with a type of the data to be transmitted, and wherein the data to be transmitted comprises signaling or a signal that is periodically sent, and wherein a length of a set time window for a first signal or signaling is longer than a length of a set time window for other signals or signaling, and the first signal or signaling has higher latency requirement than the other signals or signaling; and
listen for the data to be transmitted at the receiving position.

19. The device of claim 18, wherein the one or more processors are further configured to:
determine the receiving position within the set time window based on either a set initial transmission position or a set rule.

20. The device of claim 19, wherein the one or more processors are further configured, when the device is on a User Equipment (UE) side, to:
receive Radio Resource Control (RRC) signaling or Media Access Control (MAC) Control Element (CE) or physical-layer signaling from a base station; and determine the set time window and determine the set initial transmission position or the set rule based on the RRC signaling, or the MAC CE or the physical-layer signaling.

\* \* \* \* \*